US010412267B2

(12) United States Patent
Yasui et al.

(10) Patent No.: US 10,412,267 B2
(45) Date of Patent: Sep. 10, 2019

(54) DOCUMENT MANAGEMENT SYSTEM

(71) Applicant: KYOCERA Document Solutions Inc., Osaka (JP)

(72) Inventors: Toru Yasui, Osaka (JP); Takashi Oguma, Osaka (JP); Masato Hirota, Osaka (JP); Toshitsugu Nishimi, Osaka (JP); Chikara Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/177,237

(22) Filed: Oct. 31, 2018

(65) Prior Publication Data
US 2019/0132481 A1 May 2, 2019

(30) Foreign Application Priority Data

Oct. 31, 2017 (JP) .................. 2017-210189
Oct. 31, 2017 (JP) .................. 2017-210190
(Continued)

(51) Int. Cl.
*G06F 3/12* (2006.01)
*H04N 1/44* (2006.01)
(Continued)

(52) U.S. Cl.
CPC ............ *H04N 1/444* (2013.01); *G06F 16/93* (2019.01); *H04N 1/00421* (2013.01); *H04N 1/4446* (2013.01)

(58) Field of Classification Search
CPC .... H04N 1/444; H04N 1/448; H04N 1/00421; H04N 1/4426; H04N 1/4446;
(Continued)

(56) References Cited

U.S. PATENT DOCUMENTS

2006/0285160 A1* 12/2006 Tomita .................. H04N 1/324
358/1.16
2007/0279672 A1* 12/2007 Harada .............. H04N 1/32144
358/1.14
(Continued)

FOREIGN PATENT DOCUMENTS

JP         2007-140958 A    6/2007
JP         2008-003687 A    1/2008
(Continued)

*Primary Examiner* — Gabriel I Garcia
(74) *Attorney, Agent, or Firm* — Hawaii Patent Services; Nathaniel K. Fedde; Kenton N. Fedde

(57) ABSTRACT

Provided is a document management system for managing document data by applying access restrictions to each metadata acquired by character recognition of document data to be managed. The mage forming apparatus acquires document data to be managed. The image-processing server performs character recognition of document data and acquires metadata. The image forming apparatus specifies metadata to be concealed in document data. The image forming apparatus receives a security setting, correlates a metadata name to be concealed with the security setting, and transmits the security setting together with document data to the image-processing server. The document-management server, in the case where there is an access request from a user for document data, allows access to the document data based on the security setting by not masking metadata for which there is access authority, and masking metadata for which there is no access authority.

15 Claims, 12 Drawing Sheets

(30) Foreign Application Priority Data

Oct. 31, 2017 (JP) .................................. 2017-210191
Oct. 31, 2017 (JP) .................................. 2017-210193

(51) Int. Cl.
*H04N 1/00* (2006.01)
*G06F 16/93* (2019.01)

(58) Field of Classification Search
CPC ....... H04N 1/32128; H04N 2201/3214; H04N 2201/3246; H04N 2201/3256; G06F 16/93
USPC ......................................... 358/1.1–1.18, 402
See application file for complete search history.

(56) References Cited

U.S. PATENT DOCUMENTS

| | | | |
|---|---|---|---|
| 2007/0294375 A1 | 12/2007 | Matsubara | |
| 2008/0002911 A1* | 1/2008 | Eisen | G06F 21/6245 382/283 |
| 2008/0320604 A1* | 12/2008 | Nakajima | G06F 21/608 726/28 |
| 2014/0047507 A1* | 2/2014 | Chang | G06F 21/31 726/3 |
| 2018/0309898 A1* | 10/2018 | Elhassen | H04N 1/32144 |

FOREIGN PATENT DOCUMENTS

| | | | |
|---|---|---|---|
| JP | 2009-193164 A | 8/2009 | |
| JP | 2017-084219 A | 5/2017 | |

* cited by examiner

COMPANY A — 70

INVOICE

CHIYODA-KU, KASUMIGASEKI
○-△-× ←— 72

DATE: 12/10/2010
INVOICE NUMBER # 123456
CUSTOMER ID 101

BILLING ADDRESS a a a
COMPANY B
CHIYODA-KU ×-×-×
03-1111-○○○○

71 ▲  71-1  71-2  71-3

| ALWAYS MASK | | |
| SELF ONLY | ✓ BROWSING | |
| GROUP ONLY | ✓ PRINTING | 1 TIME |
| CANCEL | | |

72 ► TRAVEL EXPENSE  250.00
72 ► PERSONNEL EXPENSE   X   375.00

70 page 1

FIG.4

| METADATA NAME | COORDINATE INFORMATION | BROWSING AUTHORITY | PRINTING AUTHORITY | PRINTABLE NUMBER OF TIMES |
|---|---|---|---|---|
| ADDRESS 1 | Page1, Start (x1, y1), End (x2, y2) | USER A GROUP | ALL MEMBERS DISALLOWED | |
| DETAIL 1 | Page1, Start (x5, y5), End (x10, y10) | USER A | USER A | 1 TIME |
| DETAIL 2 | Page1, Start (x5, y5), End (x10, y10) | USER A | USER A | 1 TIME |

FIG.5

DOCUMENT MANAGEMENT SYSTEM

INCORPORATION BY REFERENCE

This application is based on and claims the benefit of priority from Japanese Patent Application No. 2017-210189, 2017-210190, 2017-210191, 2017-210193 filed on Oct. 31, 2017, the contents of which are hereby incorporated by reference.

BACKGROUND

The present disclosure relates to a document management system including an image forming apparatus, an image-processing server, and a document-management server.

In recent years, document data of a document scanned by using an image forming apparatus such as a copying machine, a multifunction peripheral, or the like is stored in a document-management server and can be browsed by a user via a network. From the aspect of privacy and security, it is desirable that access to document data managed by the document-management server be restricted. Therefore, a technique is proposed in which access restriction is imposed on document data to be managed, and browsing and printing are restricted.

SUMMARY

The document management system according to the present disclosure is a document management system including an image forming apparatus for acquiring document data to be managed, an image-processing server for performing character recognition of the document data and acquiring metadata, and a document-management server for managing the document data based on the metadata; wherein the image forming apparatus includes: a concealment-target-specifying unit for specifying the metadata to be concealed in the document data; and a security-setting-receiving unit that receives a security setting of the metadata specified as a concealment target by the concealment-target-specifying unit, correlates a metadata name of the concealment target with the security setting, and transmits the security setting together with the document data to the image-processing sever; and the document-management server includes: an authenticating unit for performing user authentication; and a document-data-storage unit that, in the case where there is an access request from a user for document data, determines based on the security setting whether or not the user has access authority for the metadata, and allows access to the document data by not masking the metadata for which there is access authority, and masking the metadata for which there is no access authority.

The document management system according to the present disclosure is a document management system including an image forming apparatus for acquiring document data to be managed, an image-processing server for performing character recognition of the document data and acquiring metadata, and a document-management server for managing the document data based on the metadata; wherein the image forming apparatus includes: a concealment-target-specifying unit for specifying the metadata to be concealed in the document data; and a security-setting-receiving unit that receives a security setting of the metadata specified as a concealment target by the concealment-target-specifying unit, correlates a metadata name of the concealment target with the security setting, and transmits the security setting together with the document data to the image-processing sever; and the document-management server includes a document-data-storage unit that, based on the security setting, performs access restriction to the concealment-target metadata included in the document data.

The document management system according to the present disclosure is a document management system including an image forming apparatus for acquiring document data to be managed, an image-processing server for performing character recognition of the document data and acquiring metadata, and a document-management server for managing the document data based on the metadata; wherein the image forming apparatus includes: a concealment-target-specifying unit for specifying the metadata to be concealed in the document data; and a security-setting-receiving unit that receives a security setting of the metadata specified as a concealment target by the concealment-target-specifying unit, correlates a metadata name of the concealment target with the security setting, and transmits the security setting together with the document data to the image-processing sever; and the document-management server includes: an authenticating unit for performing authentication, and a document-data-storage unit that in the case where there is an access request for the document data, allows access to the document data based on the security setting by masking the concealment-target metadata with a mask area; wherein a lock button for performing an authentication request for canceling a mask is arranged in the mask area, and in the case where an authentication request is authenticated by the authenticating unit via the lock button, the document-data-storage unit cancels the mask for the concealment-target metadata and makes it possible to visually recognize the concealment-target metadata.

BRIEF DESCRIPTION OF THE DRAWINGS

FIG. 4 is a display example of a security-setting menu.

FIG. 5 is an example of registration of security-setting information by the security-setting-receiving unit illustrated in FIG. 2.

DETAILED DESCRIPTION

Figure 1:
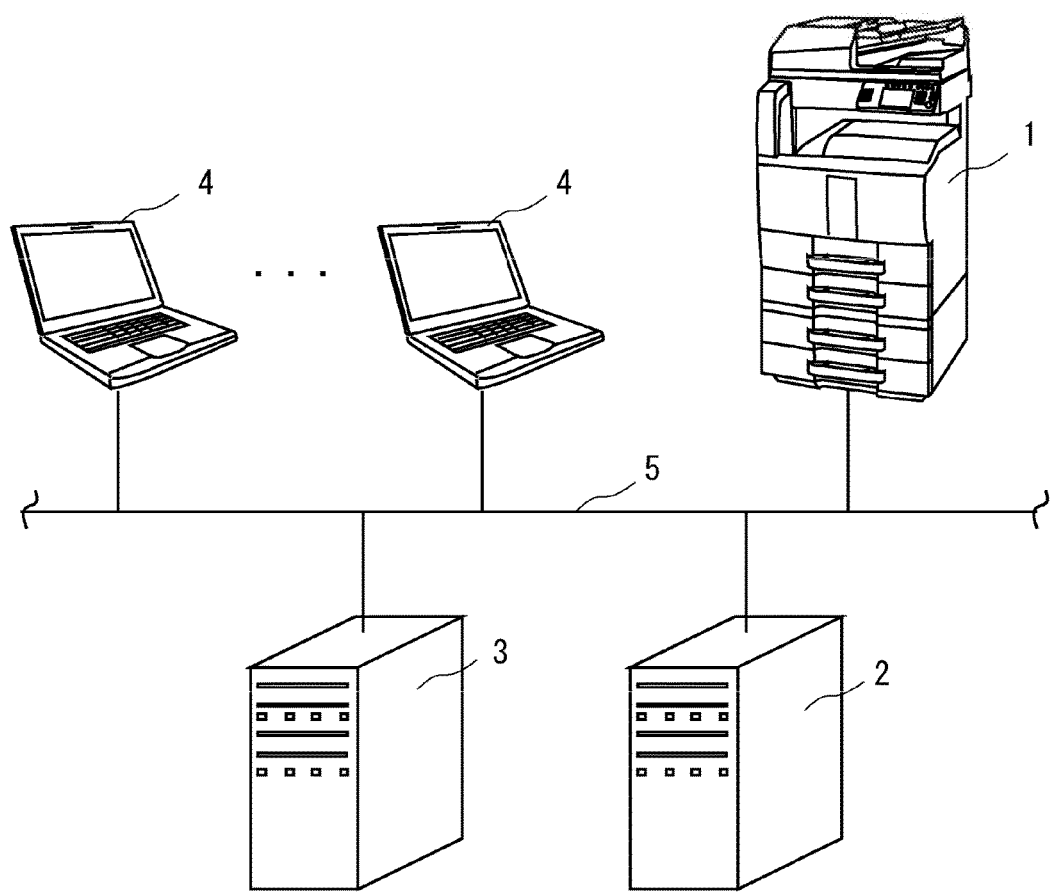
FIG. 1 is a system configuration diagram of a document management system of an embodiment according to the present disclosure.

In the following, embodiments of the present disclosure will be described in detail with reference to the drawings.

Incidentally, in the following embodiments, the same reference numerals are given to the configurations showing similar functions.

As illustrated in FIG. 1, the document management system X of the present embodiment includes an image forming apparatus 1, an image-processing server 2, a document-management server 3, and a plurality of user terminals 4. These are connected via a network 5 such as a local area network (LAN), the Internet, or the like. The image forming apparatus 1, the image-processing server 2, and the document-management server 3 may each function as a Web server. The user terminals 4 are information processing apparatuses such as a personal computer, a tablet terminal, or the like.

Figure 2:
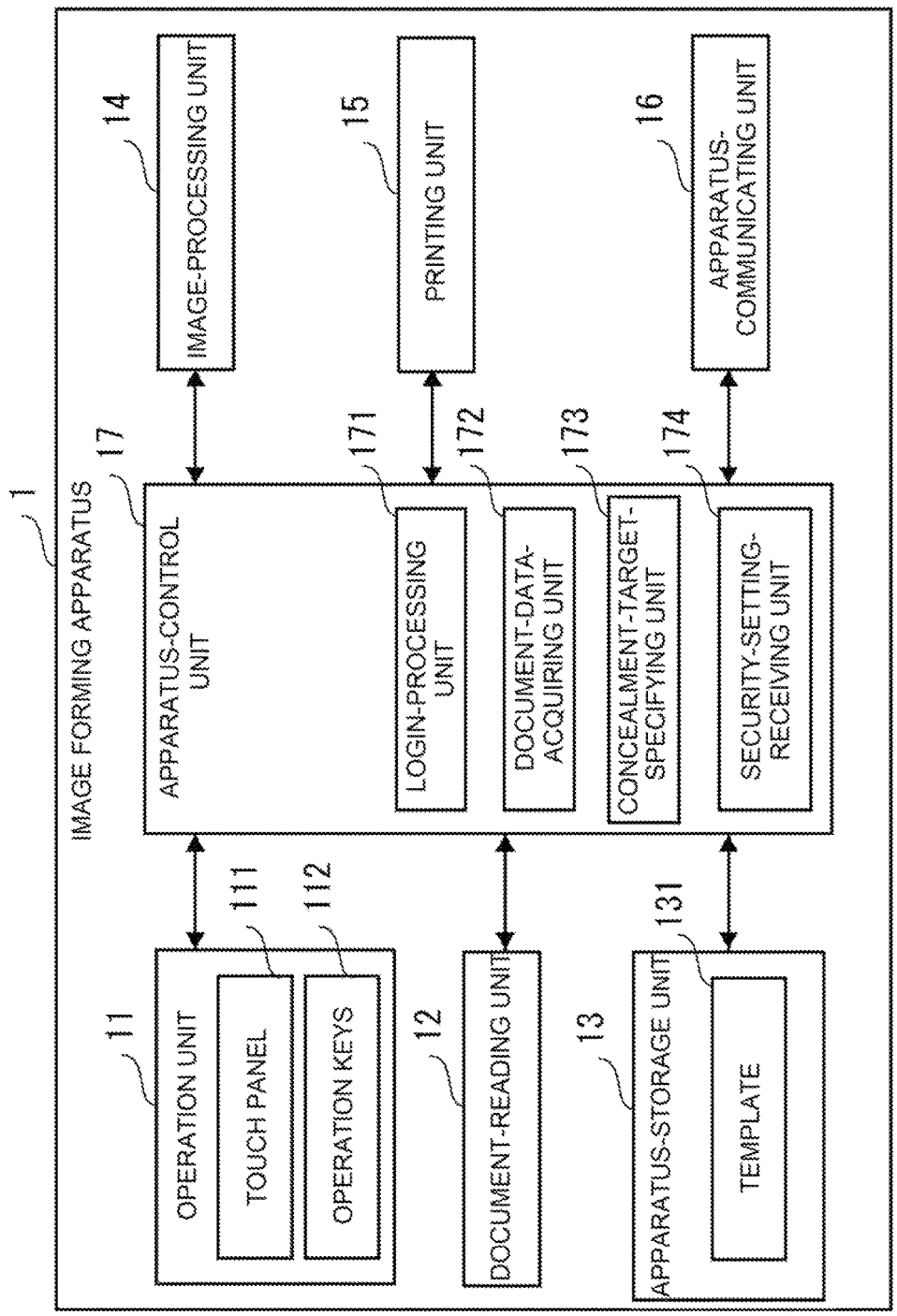
FIG. 2 is a schematic configuration diagram of the image forming apparatus illustrated in FIG. 1.

FIG. 2 is a schematic configuration diagram of an image forming apparatus 1.

The image forming apparatus 1 is a copying machine, a multifunction peripheral, or the like, and includes an operation unit 11, a document-reading unit 12, apparatus-storage unit 13, an image-processing unit 14, a printing unit 15, an apparatus-communicating unit 16, and an apparatus-control unit 17.

The operation unit 11 is a user interface. The operation unit 11 includes a touch panel 111 and various operation keys 112. The touch panel 111 functions as a display unit and an input unit. The various operation keys 112 are a numeric keypad, a reset key, a stop key, a start key, and the like. Note that instead of the touch panel 111, a display unit such as a liquid-crystal display and the like may be used.

The document-reading unit 12 includes a light source and a photoelectric-converting unit. The light source irradiates light onto a document set on a document platen or onto a document fed from a document-feeding unit (not illustrated). The photoelectric-converting unit is a charge couple device (CCD) or the like that converts reflected light from a document into image data of the document. As a result, the document-reading unit 12 scans the document and generates image data of the document.

Figure 3:
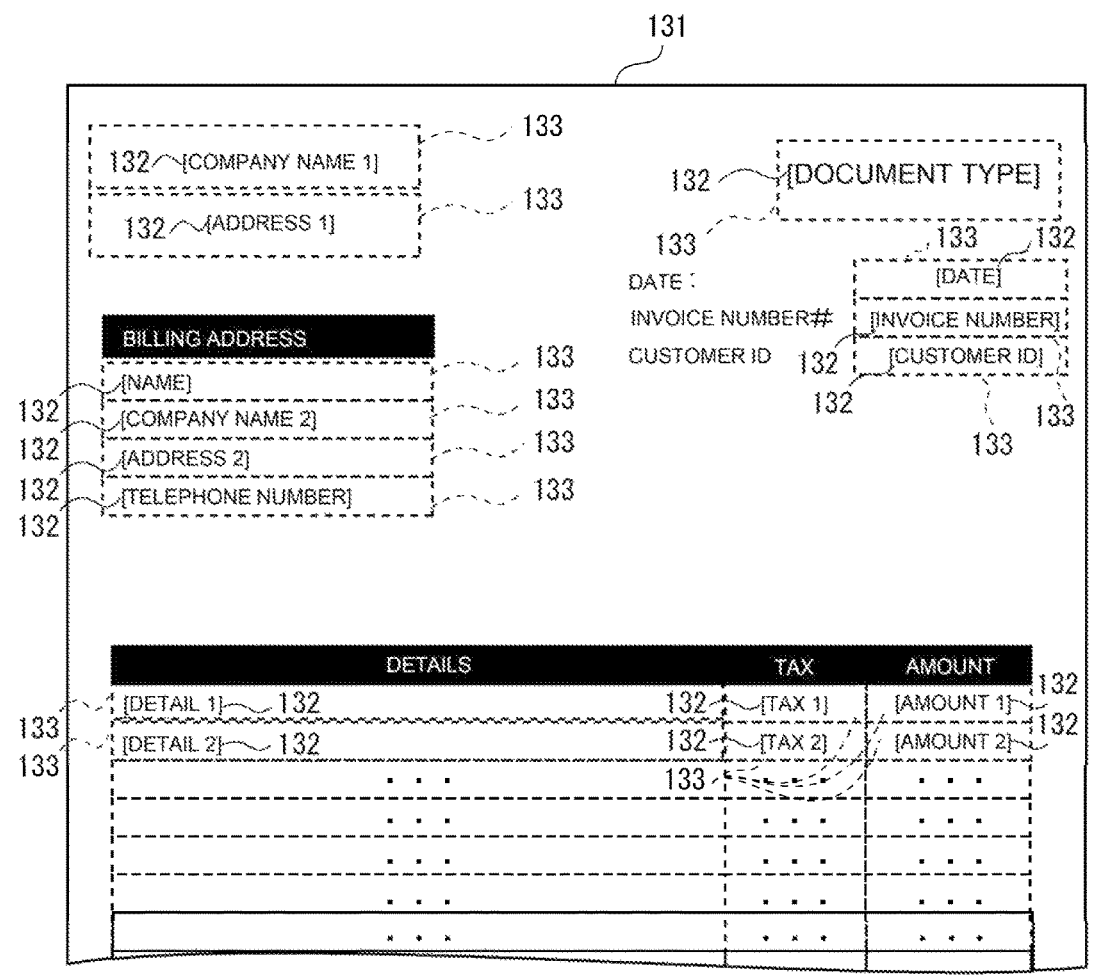
FIG. 3 is an image diagram of the template illustrated in FIG. 2.

The apparatus-storage unit 13 is storage means such as a semiconductor memory, hard disk drive (HDD), or the like. The apparatus-storage unit 13 accumulates image data read by the document-reading unit 12, document data received by the apparatus-communicating unit 16, and the like. In addition, in the apparatus-storage unit 13, templates 131 as illustrated in FIG. 3 are stored.

A template 131 is prepared for each type of document such as invoices, bills, and the like to be managed by the document management server 3. In a template 131 a frame line position in the document (layout), a character recognition target area 133, a character type in the character recognition target area 133, a metadata name 132, the metadata of which is a character string with characters that are recognized from the character recognition target area 133, and the like are set. Of these, the character type is Kanji, numbers, alphabet, and the like. The metadata name 132 is a name or the like at the time of converting a character string, the characters of which are recognized from the character recognition target area 133, as metadata. A user, via the operation unit 11, can perform various settings of a template 131, and can edit a template 131.

The image-processing unit 14 is means for performing specified image processing on image data. The image-processing unit 14 performs image processing such as an enlargement/reduction process, density adjustment, gradation adjustment, and the like.

The printing unit 15 is a printing unit for printing an image. Printing by the printing unit 15 is based on image data read by the document-reading unit 12, document data received by the apparatus-communicating unit 16, and the like.

The apparatus-communicating unit 16 has a function of transmitting and receiving various data between the image-processing server 2, the document-management server 3, and the user terminal 4 via a network 5 such as a LAN, the Internet, or the like.

The apparatus-control unit 17 is an information-processing unit such as a microcomputer, or the like. The apparatus-control unit 17 includes a central processing unit (CPU), a read only memory (ROM), a random access memory (RAM), and the like. The ROM stores a control program for controlling the operation of the image forming apparatus 1. The CPU of the apparatus-control unit 17 reads the control program stored in the ROM and develops the control program in the RAM. As a result, the CPU performs overall control of the apparatus according to specified instruction information inputted from the operation unit 11.

In addition, the apparatus-control unit 17 functions as a login-processing unit 171, a document-data acquiring unit 172, a concealment-target-specifying unit 173, and a security-setting-receiving unit 174.

The login-processing unit 171 executes a login process and permits a user to use the image forming apparatus 1. This is performed in the case where user identification information inputted via the operation unit 11 or the like is registered in user information 324 stored in advance. The user identification information is a user ID or the like. The user identification information may be inputted via the login screen displayed on the operation unit 11 or may be inputted using an IC card such as an employee ID card or the like. For example, the login-processing unit 171 transmits the inputted user identification information to the document-management server 3 via the apparatus-communicating unit 16. The login-processing unit 171 may execute the login process when determined by the document-management server 3. At this time, it is determined by the authenticating unit 331 that the user identification information is registered in the user information 324. Incidentally, the user information 324 may be stored in the apparatus-storage unit 13. In this case, the login-processing unit 171 may perform user authentication. At this time, the login-processing unit 171 compares the user identification information with the user information 324 stored in the apparatus-storage unit 13.

The document-data-acquiring unit 172 acquires document data to be managed by the document-management server 3. The document-data-acquiring unit 172 may acquire image data such as bills, invoices and the like scanned by the document-reading unit 12 as document data. In addition, the document-data-acquiring unit 172 may acquire image data that has been converted into a PDF file or the like as document data. Moreover, the document-data-acquiring unit 172 may use image data and the like received via the apparatus-communicating unit 16 as document data.

The concealment-target-specifying unit 173 preview-displays document data acquired by the document-data-acquiring unit 172 as a management target on the touch panel 111. Then, the concealment-target-specifying unit 173 specifies metadata as a concealment target. The metadata to be concealed is a character string in document data. This can be specified by the user on the touch panel 111. Based on the template 131, the concealment-target-specifying unit 173 grasps the metadata description location in the document data being preview-displayed. In addition, the concealment-target-specifying unit 173 may also specify metadata corresponding to a position touched by the user as the metadata to be concealed. For example, as metadata corresponding to a touched position, a character string in the character recognition target area 133 corresponding to the touched position may be specified. This character string may be specified as metadata to be concealed.

In addition, a character string to be concealed may be marked by tracing or circling the character string with a fluorescent pen or the like in advance on a document to be scanned. In this case, the marked document is scanned and acquired as document data by the document-data-acquiring unit 172. Then, the concealment-target-specifying unit 173 detects the mark from the document data. The concealment-target-specifying unit 173 then references the template 131. The concealment-target-specifying unit 173 may specify the metadata (character string) corresponding to the position of a detected mark as metadata to be concealed. In addition, the concealment-target-specifying unit 173 may specify both the metadata corresponding to the position of the mark and the metadata corresponding to a position touched via the touch panel 111 by the user as a concealment target.

Based on the template 131, the concealment-target-specifying unit 173 specifies a description area 70 in the document data for the metadata specified as the concealment target. The description area 70 may be a character recognition target area 133. As illustrated in FIG. 4, the specified description area 70 may be combined and displayed in the preview-displayed document data. The concealment-target-specifying unit 173 may combine and display the rectangular description area 70 in the preview-displayed document data. The user can designate this rectangular description area 70 as a diagonal line from the start point to the end point of the finger by sliding a finger on the touch panel 111. In addition, the concealment-target-specifying unit 173 may be configured to be able to adjust the position and size of the description area 70 that is combined and displayed. This adjustment can be specified by the user via the touch panel 111. Moreover, in the case where the user creates the description area 70 on the touch panel 111, the concealment-target-specifying unit 173 may specify the metadata included in the created description area 70 as a concealment target.

The security-setting-receiving unit 174 displays a security-setting menu 71 on the touch panel 111 when the concealment-target-specifying unit 173 specifies the metadata to be concealed. As a result, the security-setting-receiving unit 174 receives the security setting for the metadata to be concealed.

In the security-setting menu 71, there is a main menu 71-1 that includes "Always Mask", "Self Only", "Group Only" and "Cancel". As a result, it is possible to perform a security setting when browsing and printing document data. When "Always Mask" is selected, browsing and printing of the metadata to be concealed is set to be impossible for all users. When each user browses and prints document data, it is masked and unreadable. As a result, browsing and printing are restricted. For example, the description area 70 of the metadata to be concealed is masked by a mask area 80 (refer to FIG. 9) such as a black solid image or the like. When "Self Only" is selected, only the login user is set to be able to browse and print the metadata that is the concealment target. When another user browses and prints the document data, the description area 70 of the metadata that is the concealment target is masked, and browsing and printing are restricted. When "Group Only" is selected, only users belonging to the group to which the login user belongs are set to be able to browse and print this metadata. When the users of another group browse and print document data, the description area 70 of the metadata that is the concealment target is masked, and browsing and printing are restricted. Note that browsing and printing are not restricted for the group to which the login user belongs, but it may be possible to set the group name that the login user is permitted to access. When "Cancel" is selected, the specification to set the metadata as a concealment target is canceled. The security-setting menu 71 is then closed.

In the case where "Always Mask", "Self Only", "Group Only" are selected, submenu 71-2 is displayed. Then, of "Browsing" and "Printing" in the submenu, the checked item is set as a restriction target. It is possible to check only one of the items "Browsing" and "Printing". Alternatively, it is possible to check both items. When "Printing" is checked, the submenu 71-3 is further displayed. Here, it is possible to set the number of times printing is possible (printable number of times). In the submenu 71-3, it is possible to set the specific printable number of times as "1 time", "2 times", "3 times", "10 times", "unlimited", for example. For example, when it is necessary to print only a part of an invoice or the like as an original, it may be set to "1 time". The user can specify a plurality of pieces of metadata to be concealed and can perform security settings for each specified metadata.

The security-setting-receiving unit 174 receives the security settings. Then, as illustrated in FIG. 5, the security-setting-receiving unit 174 correlates the metadata name 132 to be concealed, the coordinate information indicating the description area 70 of the metadata specified as a concealment target, the browsing authority, the printing authority, and the printable number of times. As a result, the security-setting-receiving unit 174 creates the security-setting information 73.

For example, as supposed, the user A specifies "Chiyoda-ku Kasumigaseki ○-Δ-×" as the concealment target metadata 72, sets "Always Mask" for "Printing" in the security-setting menu 71, and sets "Group Only" for "Viewing". In this case, in the security-setting information 73, "Chiyoda-ku Kasumigaseki ○-Δ-×" as the concealment target metadata 72, "Address 1" is registered as the metadata name 132, "Page 1, Start (x1, x2), End (x2, y2)" is registered as the coordinate information, "User A Group" is registered as the browsing authority, and "All Members Disallowed" is registered as the printing authority. In this case, since the printable number of times is not set, that setting is left blank.

Moreover, it is presumed that the user A includes "Travel Expenses" and "Personnel Expenses" in one description area 70, whereby each is specified as concealment-target metadata 72. Furthermore, in the security-setting menu 71, it is presumed that the user A sets "Self Only" for "Browsing" and "Printing", and sets "1 Time" for the "Printable Number of Times". In this case, in the security-setting information 73, "Detail 1" and "Detail 2" are each registered as the metadata name 132, "Page 1, Start (x5, y5), End (x10, y10)" is registered as coordinate information, "User A" is registered as the browsing authority, "User A" is registered as the printing authority, and "1 Time" is registered as the printable number of times. In this way, the description area 70 is created on the touch panel 111 so as to include a plurality of metadata to be concealed. As a result, a plurality of pieces of metadata can be specified as the concealment-target metadata 72 at one time, and the same security setting can be collectively set.

When an instruction to transmit document data is received by the operation unit 11, the security-setting-receiving unit 174 ends the preview-display of the document data. Then, the security-setting-receiving unit 174 transmits the document data and the security-setting information 73 to the image-processing server 2. The security-setting-information 73 is set by the user as described above. Alternatively, the security-setting-information 73 is default information. In addition, the security-setting-receiving unit 174 may transmit document data and default security-setting information 73. This default security-setting information 73 is used when the security setting by the user is not performed for the document data displayed as the preview. For example, the default security-setting information 73 may be a security setting of no access restriction (no security) for each metadata. In addition, the default security-setting information 73 may be security setting for the metadata 72. In this case, the metadata 72 is a concealment target specified by the user beforehand. Moreover, the user may set beforehand the metadata name to be concealed and the security setting thereof in the template 131 via the operation unit 11.

Figure 6:
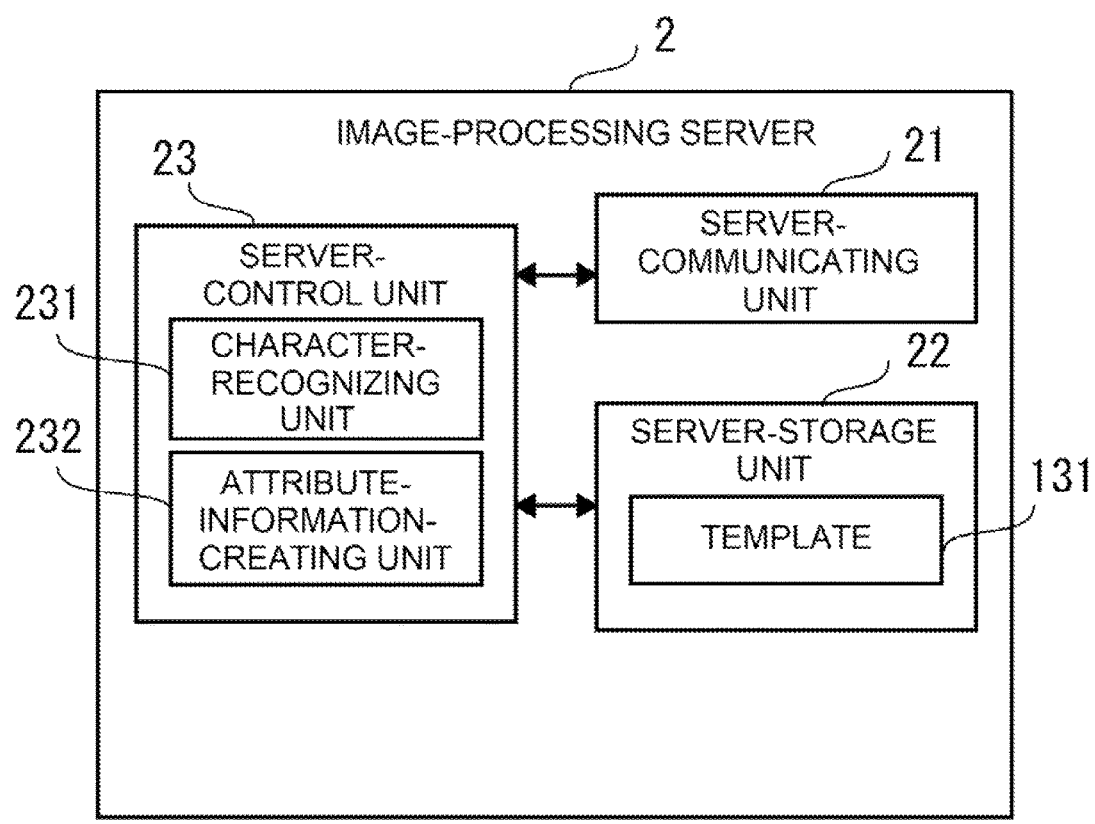
FIG. 6 is a schematic configuration diagram of the image-processing server illustrated in FIG. 1.

FIG. 6 is a schematic configuration diagram of the image-processing server 2. The image-processing server 2 includes a server-communicating unit 21, a server-storage unit 22, and a server-control unit 23.

The server-communicating unit 21 transmits and receives various data to and from the image forming apparatus 1 and the document-management server 3 via a network 5 such as a LAN, the Internet, or the like.

The server-storage unit 22 is a storage unit such as a semiconductor memory, HDD, or the like. The server-storage unit 22 stores a template 131. The template 131 is the same as the template 131 stored in the image forming apparatus 1. This template 131 is used for an OCR (Optical Character Recognition) process.

The server-control unit 23 is an information-processing unit such as a microcomputer or the like including a CPU, a ROM, a RAM and the like. The ROM stores a control program for controlling the operation of the image-processing server 2. The CPU of the server-control unit 23 reads out the control program stored in the ROM and develops the control program in the RAM. As a result, the CPU performs control of the entire server. In addition, the server-control unit 23 functions as a character-recognizing unit 231 and an attribute-information-creating unit 232.

The character-recognizing unit 231 executes an OCR process on document data transmitted from the image processing apparatus 1 based on the template 131, and extracts a character string from the document data. The character-recognizing unit 231 may extract a character string by a zone OCR that recognizes characters in a character-recognition-target area 133. At this time, the character-recognition-target area 133 for the document data is automatically adjusted by the character-recognizing unit 231. This is a case in which there is an increase or decrease in the character strings, the number of lines, or the like in the character-recognition-target area 133 in the document data with respect to the character-recognition-target area 133 of the template 131.

The attribute-information-creating unit 232 acquires a character string extracted by the character-recognizing unit 231 as metadata. At this time, the attribute-information-creating unit 232 arranges metadata data types and input rules based on metadata-setting information (not illustrated). In the metadata-setting information, data types, input rules, and the like are registered. These are used when transmitting character strings extracted from document data by an OCR process to the document-management server 3 as metadata.

Continuing, the attribute-information-creating unit 232 acquires the coordinate information of the metadata in the document data based on the character recognition result of the character-recognizing unit 231. The coordinate information indicates the description position of the metadata acquired by character recognition from the document data. The coordinate information includes, for example, a page number, starting-point coordinates and ending-point coordinates indicating the description area 70 of metadata. The description area 70 can be the smallest rectangular area that includes the metadata acquired from the character recognition result. A description area 70 is formed for each acquired metadata. In addition, the starting-point coordinates and the ending-point coordinates may be coordinates with the upper left corner of the page in the document data as a reference, for example. With this coordinate information, it is possible to specify in which area of which page in each document data each metadata is described. Incidentally, when the acquired metadata is specified as a concealment target, the attribute-information-creating unit 232 may acquire the coordinate information included in the security-setting information 73 instead of the coordinate information based on the character recognition result. This may be performed based on the security-setting information 73 transmitted together with the document data from the image forming apparatus 1.

Continuing, the attribute-information-creating unit 232 creates attribute information 322 by correlating the acquired metadata, the coordinate information, and the security setting included in the security-setting information 73. In other words, concealment-target metadata 72 is correlated with the coordinate information and security setting with access restriction. In addition, metadata that is not specified as a concealment target is correlated with coordinate information and security setting without access restriction. The attribute-information-creating unit 232 acquires document data, to which the character recognition result by the character-recognizing unit 231 is added, as the document data 321. Then, the attribute-information-creating unit 232 transmits the document data 321 to the document-management server 3 together with the created attribute information 322. Note that the document data transmitted from the image forming apparatus 1 may be used as the document data 321. In this case, the document data is document data without a character recognition result.

Figure 7:
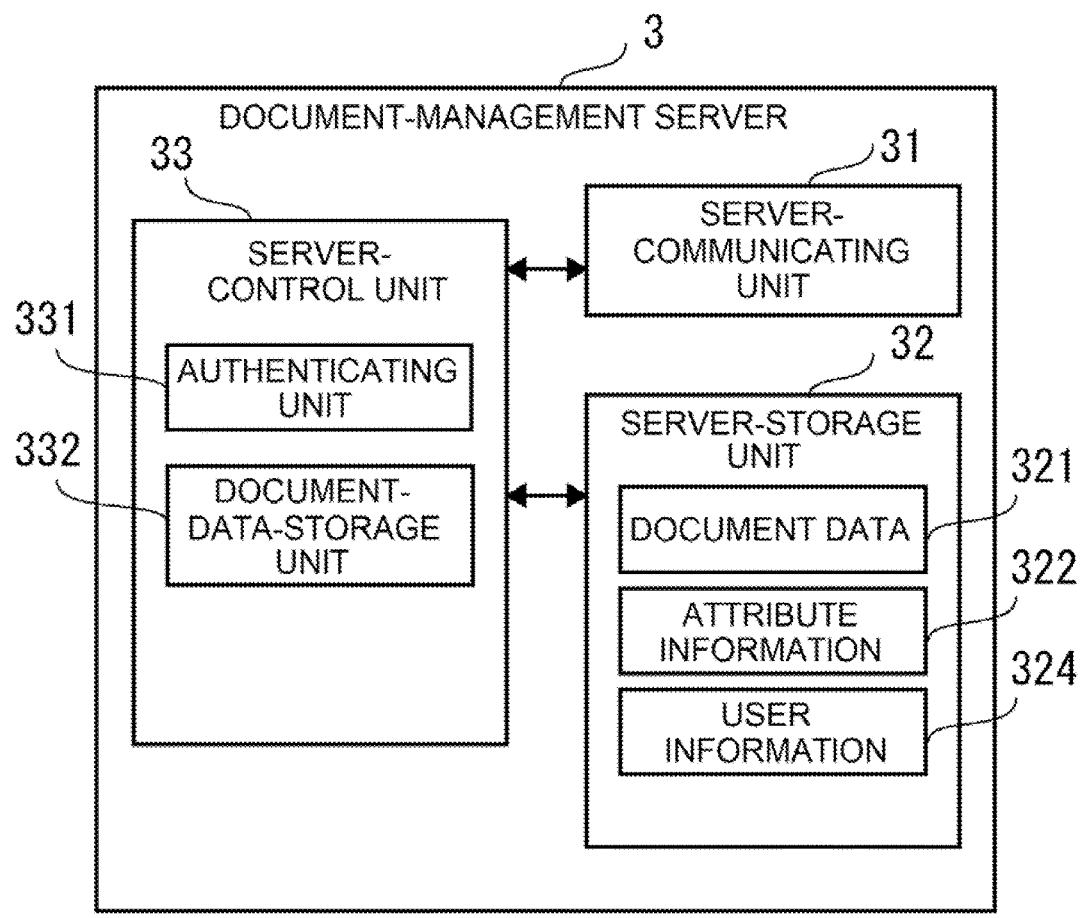
FIG. 7 is a schematic configuration diagram of the document-management server illustrated in FIG. 1.

FIG. 7 is a schematic configuration diagram of the document-management server 3.

The document-management server 3 includes a server-communicating unit 31, a server-storage unit 32, and a server-control unit 33.

The server-communicating unit 31 transmits and receives various data between the image forming apparatus 1, the image-processing server 2, and the user terminal 4 via a network 5 such as a LAN, the Internet, or the like.

The server-storage unit 32 is a storage unit such as a semiconductor memory, HDD, or the like. The server-storage unit 32 stores document data 321 and attribute information 322 transmitted from the image-processing server 2. In addition, the server-storage unit 32 stores user information 324.

Figure 8:
FIG. 8 illustrates an example of registration of user information illustrated in FIG. 7.

As illustrated in FIG. 8, the user information 324 includes a user ID and a user name for identifying a user, and a group name such as a department, a section, or the like to which the user belongs. The group name may be categorized according to the duties of the section chief, the manager, or the like. Moreover, the same user may belong to plural groups.

The server-control unit 33 is an information-processing unit such as a microcomputer or the like including a CPU, a ROM, a RAM and the like. The ROM stores a control program for performing control of the operation of the document-management server 3. The CPU of the server-control unit 33 reads out the control program stored in the ROM and develops the control program in the RAM to perform control of the entire server. In addition, the server-control unit 33 functions as an authenticating unit 331 and a document-data-storage unit 332.

The authenticating unit 331 executes user authentication by comparing the user identification information transmitted from the image forming apparatus 1 and the user terminal 4 with the user information 324. In the case where the transmitted user identification information is registered in the user information 324, the authenticating unit 331 allows the user to log in.

The document-data-storage unit 332 stores the document data 321 and the attribute information 322 transmitted from the image-processing server 2 in the server-storage unit 32. The stored data can be accessed by the user. The document-data-storage unit 332 may manage the document data 321 based on the metadata included in the document data 321. Based on the security setting included in the attribute information 322, the document-data-storage unit 332 determines whether or not there is an access authority for the metadata described in the document data 321. This is a case where an access request is made from the user to the stored document data 321 via the user terminal 4 or the image forming apparatus 1. The document-data-storage unit 332 does not mask metadata for which there is access authority and masks metadata for which there is no access authority. Then, the document-data-storage unit 332 allows access to the document data 321.

For example, in the case where the access request is a browsing request, the document data 321 in which the metadata is masked according to the browsing authority of the user is displayed on the user terminal 4 or the image forming apparatus 1. When the access request is a printing request, the document data 321 in which the metadata is masked according to the printing authority of the user is transmitted to the image forming apparatus 1, and printing is enabled. Note that, in the same document data 321, the level of the browsing authority of the user and the level of the access authority may be different from each other in some cases. In this case, for example, all the metadata can be displayed in browsing, but part of the metadata is masked in printing.

Figure 9:
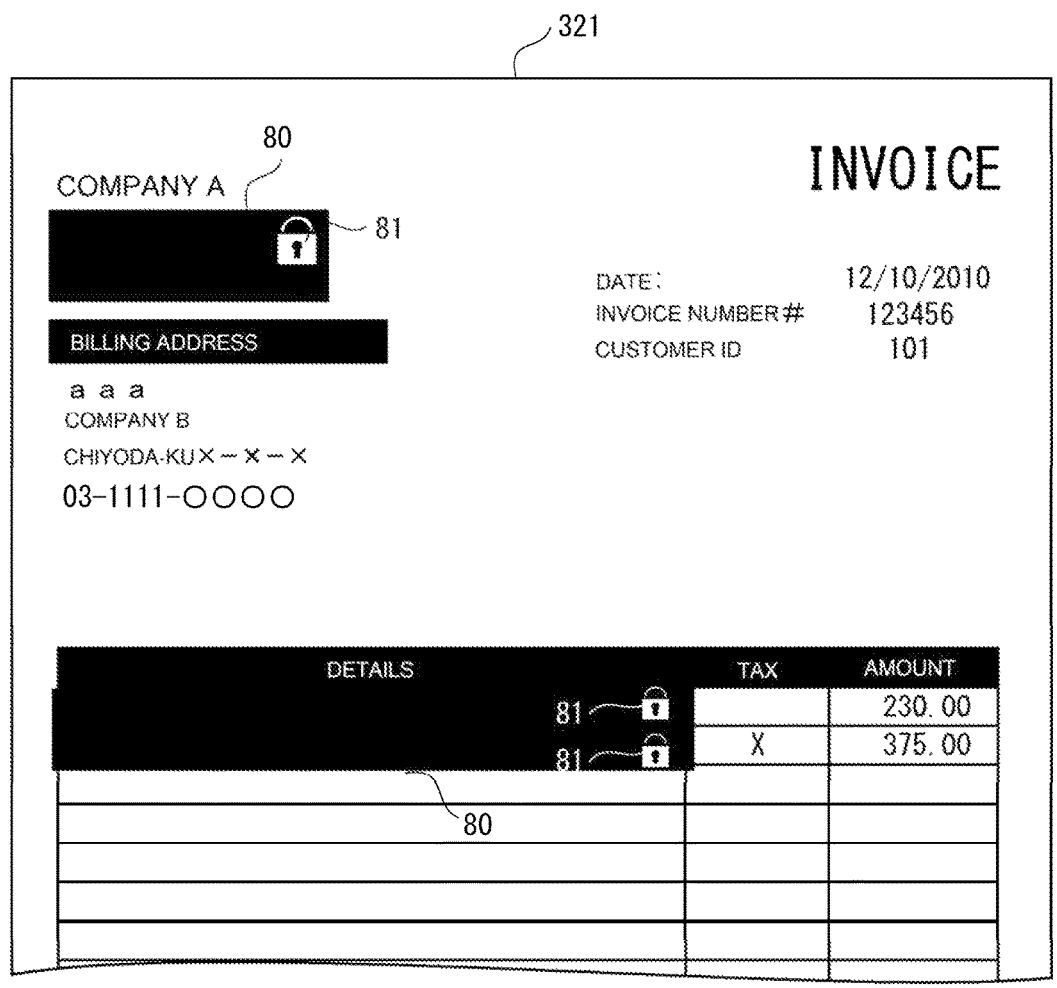
FIG. 9 is an image diagram of a lock button displayed in a mask area.

FIG. 9 illustrates a display example of document data 321 in which metadata for which there is no browsing authority is masked in a mask area 80.

For example, it is presumed that a user A performs the security setting illustrated in FIG. 5 on the document data illustrated in FIG. 4. In the security setting illustrated in FIG. 5, a user B has neither the browsing authority nor the printing authority given to this document data. In the case where the user B makes a request for browsing the document data, user B does not have authority to browse the metadata corresponding to the metadata name 132 of "address 1", "detail 1", and "detail 2". Therefore, the metadata corresponding to "address 1", "detail 1", and "detail 2" are each masked by the mask area 80 and displayed invisibly. The document-data-storage unit 332 may indicate the access-restricted area by arranging a lock button 81 on the mask area 80.

The document-data-storage unit 332 may add an authenticating function to the lock button 81. A user for which browsing-restricted document data 321 is displayed clicks or touches the lock button 81 via the user terminal 4 or the image forming apparatus 1. As a result, the document-data-storage unit 332 may display a password-input screen requesting password input. Then, the password is inputted via the password-input screen. As a result, the document-data-storage unit 332 may output an authentication request of the inputted password to the authentication unit 331. In other words, in the case where the user cancels the mask area 80, additional authentication is required in addition to user authentication. In the case where the authenticating unit 331 authenticates that a specific password has been inputted, the document-data-storage unit 332 may cancel the masking on the metadata for which there is no browsing authority. In other words, the metadata may be displayed so as to be visible. In this case, the document-data-storage unit 332 may temporarily cancel the browsing restriction of the metadata only for the current browsing. In addition, the document-data-storage unit 332 may give the user the browsing authority to this metadata and perform control so as not to mask this metadata even at the time of subsequent browsing. Moreover, the document-data-storage unit 332 may arrange a lock button 81 in any one of the mask areas 80. Furthermore, in the case where an authentication request via the lock button 81 is authenticated by the authentication unit 331, the document-data-storage unit 332 may cancel the mask for all the concealment-target metadata 72 in the document data 321. Then, the document-data-storage unit 332 may make all the concealment-target metadata 72 visible. Accordingly, all mask areas 80 can be cancelled with one authentication request, so usability can be improved.

Figure 10:
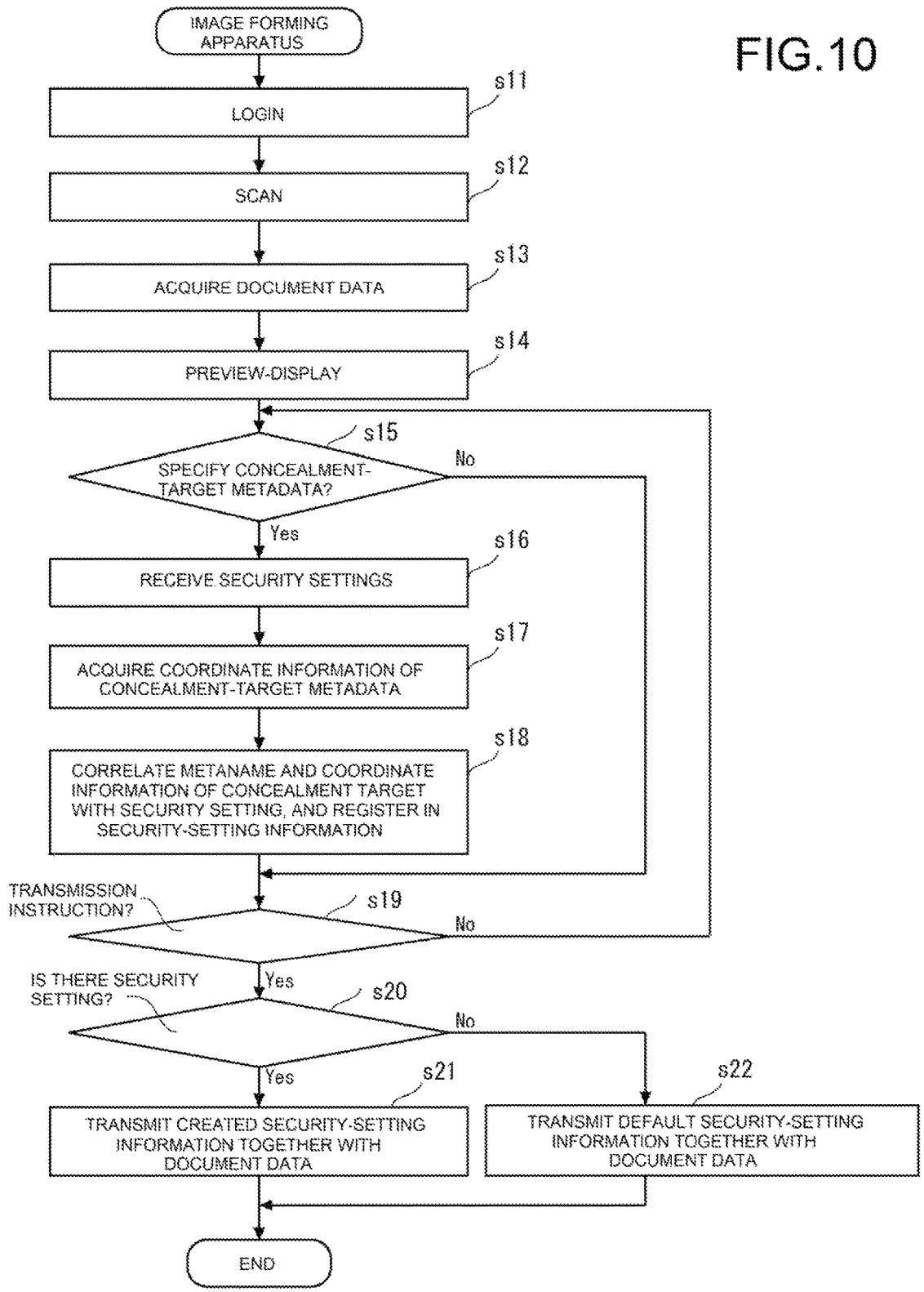
FIG. 10 is a flowchart illustrating the flow of a document data transmission process by the image forming apparatus illustrated in FIG. 1.
Figure 11:
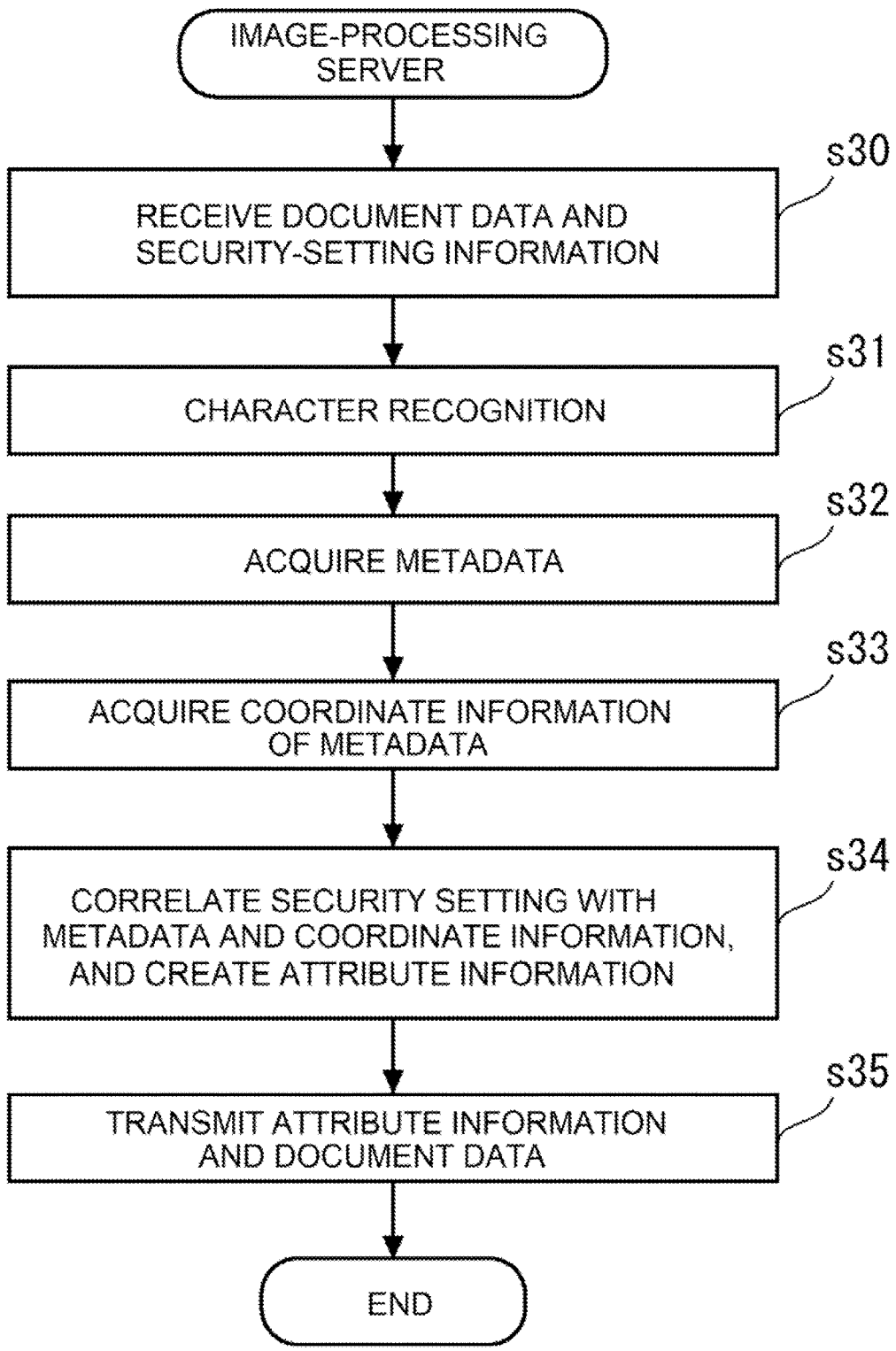
FIG. 11 is a flowchart illustrating the flow of a metadata acquisition process by the image-processing server illustrated in FIG. 1.
Figure 12:
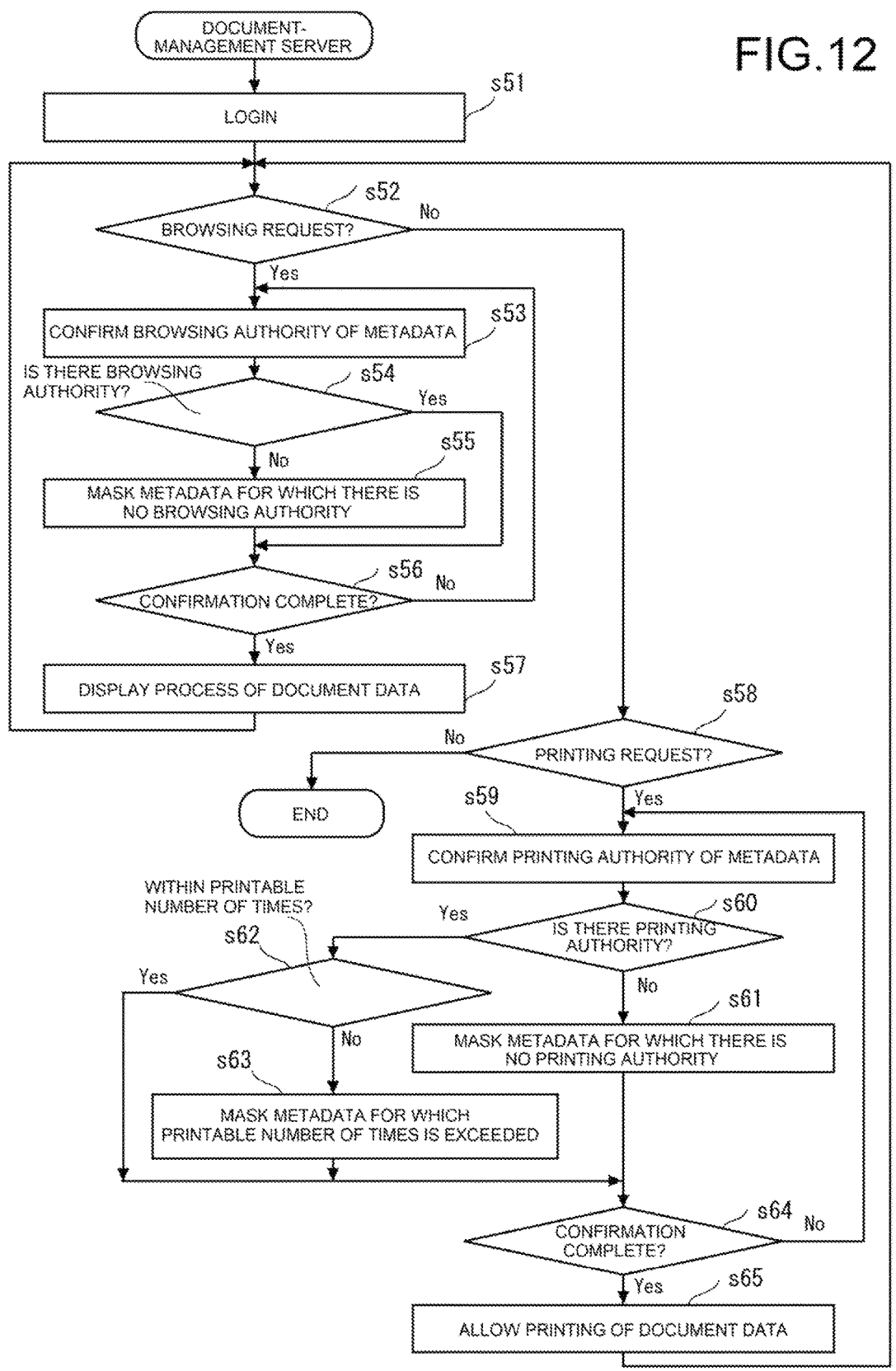
FIG. 12 is a flowchart illustrating the flow of an access restriction process by the document-management server illustrated in FIG. 1.

Next, the flow of the document management process of the document management system X will be described with reference to FIGS. 10 to 12.

First, with reference to FIG. 10, the flow of a document-data-transmission process of the image forming apparatus 1 will be described.

The login-processing unit 171 logs in a user to the image forming apparatus 1 based on the user identification information inputted from the user (S11). Next, the document-reading unit 12 scans a document (original document) to be managed such as a bill or the like set by the user (S12). Then, the document-data-acquiring unit 172 acquires image data generated by the document-reading unit 12 as document data (S13).

Continuing, the concealment-target-specifying unit 173 preview-displays the document data acquired by the document-data-acquiring unit 172 on the touch panel 111 (S14). Next, the concealment-target-specifying unit 173 determines whether or not concealment-target metadata 72 has been specified for the preview-displayed document data (S15). For example, the concealment-target-specifying unit 173 may specify the metadata corresponding to a position touched by the user via the touch panel 111 as a concealment target. In addition, the concealment-target-specifying unit 173 may specify metadata corresponding to the position of a mark detected from the document data as a concealment target. In the case where concealment-target metadata is not specified (S15: NO), the process proceeds to S19.

When concealment-target metadata 72 is specified (S15: YES), the security-setting-receiving unit 174 displays the security-setting menu 71 on the touch panel 111 and receives a security setting (S16). With the security setting, the user can set access restrictions for the concealment-target metadata 72.

Continuing, the security-setting-receiving unit 174 acquires coordinate information indicating the description position of the concealment-target metadata 72 in the document data (S17). The security-setting-receiving unit 174 correlates the metadata name 132 and the coordinate information of the concealment-target metadata 72, with and the security setting set by the user, and registers them in the security-setting information 73 (S18).

Next, the security-setting-receiving unit 174 determines whether or not the user issues an instruction to transmit document data, for example, by pressing a start key or the like (S19). In the case where there is no transmission instruction (S19: NO), the security-setting-receiving unit 174 returns the process to S15 that specifies the concealment-target metadata. In other words, the user can repeatedly specify the concealment-target metadata 72 via the touch panel 111 until the transmission instruction is issued, and can perform a security setting.

When there is a transmission instruction (S19: YES), the security-setting-receiving unit 174 determines whether or not the security setting by the user has been set for the preview-displayed document data (S20). In the case where the security setting is received in S16, the security-setting-receiving unit 174 determines that there is a security setting (S20: YES). The security-setting-receiving unit 174 transmits the created security-setting information 73 together with the document data (S21), and ends this process.

On the other hand, in the case where the process of S16 of receiving the security setting from the user is not executed, the security-setting-receiving unit 174 determines that there is no security setting (S20: NO). The security-setting-receiving unit 174 transmits the pre-registered default security-setting information 73 together with the document data (S22), and ends this process.

Next, the flow of the metadata acquisition process of the image processing server 2 will be described with reference to FIG. 11.

The server-communicating unit 21 receives the document data and the security-setting information 73 from the image forming apparatus 1 (S30). Then, the character-recognizing unit 231 executes the OCR process based on the template 131 and performs character recognition of the document data (S31).

Continuing, with reference to the template 131, the attribute-information-creating unit 232 acquires a character string extracted by the character-recognizing unit 231 as metadata (S32). Next, the attribute-information-creating unit 232 acquires the coordinate information of the acquired metadata (S33). The coordinate information may be coordinate information acquired based on the character recognition result. Alternatively, the coordinate information may be coordinate information specified by the user as the description area 70 of the concealment-target metadata 72.

Then, the attribute-information-creating unit 232 correlates the security setting with the acquired metadata and coordinate information, and creates attribute information 322 (S34). This security setting is based on the security-setting information 73 transmitted from the image forming apparatus 1. Continuing, the attribute-information-creating unit 232 transmits the created attribute information 322 and the document data 321 to the document-management server 3 (S35), and ends this process. As a result, the attribute information 322 and the document data 321 are transmitted to the document-management server 3. These are stored in the server-storage unit 32 by the document-data-storage unit 332. Note that the document data 321 transmitted to the document-management server 3 may have a character recognition result added by the character-recognizing unit 231. Alternatively, the document data 321 may be document data without a character recognition result transmitted from the image forming apparatus 1. Moreover, in the case where the concealment-target metadata 72 is not specified by the user, the security-setting-receiving unit 174 may transmit only the document data. In this case, it is not necessary to add the default security-setting information 73 to the document data.

In the case of transmitting the document data to which security-setting information 73 is not attached, the attribute-information-creating unit 232 may create the attribute information 322 by correlating the metadata, the coordinate information, and a security setting having no access restriction.

Next, with reference to FIG. 12, the flow of the access restriction process of the document data 321 by the document-management server 3 will be described. Incidentally, it is presumed that document data 321 and attribute information 322 are stored in the server-storage unit 32.

First, the authenticating unit 331 of the document-management server 3 receives the login of the user via the image forming apparatus 1 or the user terminal 4 (S51). Continuing, the document-data-storage unit 332 determines whether or not there is a browsing request from the user for the document data 321 (S52).

In the case where there is a browsing request (S52: YES), the document-data-storage unit 332 refers to the security setting included in the attribute information 322 of the document data 321 requested for browsing. The document-data-storage unit 332 confirms the browsing authority of the user for the metadata in the document data 321 requested for browsing (S53). In the case where there is authority to browse metadata (S54: YES), the process proceeds to S56. In the case where there is no authority to browse the metadata (S54: NO), the document-data-storage unit 332 masks metadata for which there is no browsing authority based on the coordinate information included in the attribute information 322 (S55). As a result, the metadata for which there is no browsing authority is masked in the mask area 80.

Continuing, the document-data-storage unit 332 determines whether confirmation of browsing authority has been completed for all of the metadata in the document data 321 (S56). In the case where the confirmation has not been completed (S56: NO), the process returns to S53.

When confirmation of all the metadata in the document data 321 is completed (S56: YES), the document-data-storage unit 332 executes a display process of the document data 321 (S57). Then, the document-data-storage unit 332 returns the process to S52. As a result, the metadata for which there is browsing authority is not masked. Then, the document data 321 in which metadata not having browsing authority is masked is displayed on the user terminal 4 or the image forming apparatus 1 via a browser, for example.

In this display process, in the case where the lock button 81 illustrated in FIG. 9 that is arranged in the mask area 80 is operated, the document-data-storage unit 332 requests additional authentication such as a password, or the like. In the case where a specified password is inputted, the document-data-storage unit 332 cancels the mask area 80 corresponding to the operated lock button 81, and displays the metadata in a visually recognizable manner.

On the other hand, in the case where there is no browsing request (S52: NO), the document-data storage unit 332 determines whether or not there is a printing request for the document data 321 (S58). In the case where there is a printing request (S58: YES), the document-data-storage unit 332 refers to the security setting included in the attribute information 322. Then, the document-data-storage unit 332 confirms the printing authority of the user for the metadata in the document data 321 requested to be printed (S59).

When there is no metadata printing authority (S60: NO), the document-data-storage unit 332 masks metadata for which there is no printing authority (S61). As a result, metadata for which there is no printing authority is masked in the mask area 80. Continuing, the document-data-storage unit 332 determines whether or not confirmation of the printing authority has been completed for all of the metadata in the document data 321 (S64). In the case where confirmation is not complete (S64: NO), the process returns to S59.

On the other hand, in the case where there is metadata for which there is printing authority (S60: YES), the document-data-storage unit 332 determines whether or not the number of times is within the printable number of times set in the security setting (S62). Incidentally, the document-data-storage unit 332 may manage the number of times of printing by a user for the document data 321 stored in the server-storage unit 32. In this case, the document-data storage unit 332 can determine whether or not the number of times of printing the document data 321 based on the current printing request is within the printable number of times. In the case where the number of times is within the printable number of times (S62: YES), the process proceeds to S64. On the other hand, in the case where the printable number of times is exceeded (S62: NO), the document-data-storage unit 332 masks the metadata for which the printable number of times is exceeded (S63) and advances the process to S64.

When confirmation of all the metadata in the document data 321 is completed (S64: YES), the document-data-storage unit 332 allows printing of the document data 321 (S65) and returns the process to S52. As a result, there is printing authority and metadata within the printable number of times is not masked. Moreover, document data 321, in which metadata without printing authority and metadata with printing authority that exceeds the number of printable times are masked, is transmitted to the image forming apparatus 1 and printed.

Incidentally, in the case where there is neither a browsing request nor a printing request for the document data 321 (S58: NO), the present process is terminated.

With the configuration as described above, the following effects can be obtained.

In a typical technique, there is a problem in that it is impossible to restrict access to each metadata acquired by character recognition of document data to be managed.

The document management system of the present embodiment is made in consideration of the above-described problems. An object of the technique according to the present disclosure is to provide a technique capable of managing document data by restricting access to each metadata acquired by character recognition of document data to be managed.

In regard to this, the document management system X is a document management system X that includes an image forming apparatus 1 for acquiring document data to be managed, an image-processing server 2 for performing character recognition of document data and acquiring metadata, and a document-management server 3 for managing document data based on metadata; wherein the image forming apparatus 1 includes: a concealment-target-specifying unit 173 for specifying metadata to be concealed in the document data; and a security-setting-receiving unit 174 that receives a security setting of metadata specified as a concealment target by the concealment-target-specifying unit 173, correlates a metadata name of the concealment target with the security setting, and transmits the security setting together with the document data to the image-processing sever 2; and the document-management server 3 includes: an authenticating unit 331 for performing user authentication, and a document-data-storage unit 332 that in the case where there is an access request from a user for document data, determines based on the security setting whether or not the user has access authority for metadata, and allows access to the document data by not masking metadata for which there is access authority, and masking metadata for which there is no access authority.

With this kind of configuration, document data can be managed by performing character recognition of the document data to be managed and applying access restriction to each metadata acquired. In the present embodiment, for the document data to be managed, it is possible to respectively perform access restriction related to browsing and printing for each metadata to be concealed, and it is possible to perform detailed access restriction according to the level of concealment to be performed.

Moreover, the document management system X is a document management system X that includes an image forming apparatus 1 for acquiring document data to be managed, an image-processing server 2 for performing character recognition of document data and acquiring metadata, and a document-management server 3 for managing document data based on metadata; wherein the image forming apparatus 1 includes: a concealment-target-specifying unit 173 for specifying metadata to be concealed in the document data; and a security-setting-receiving unit 174 that receives a security setting of metadata specified as a concealment target by the concealment-target-specifying unit 173, correlates a metadata name of the concealment target with the security setting, and transmits the security setting together with the document data to the image-processing sever 2; and the document-management server 3 includes a document-data-storage unit 332 that, based on the security setting, performs access restriction to the concealment-target metadata included in the document data.

As a result, for document data to be managed, it is possible to respectively perform access restriction related to browsing and printing for each metadata to be concealed, and it is possible to perform detailed access restriction according to the level of concealment to be performed.

Furthermore, the document management system X is a document management system X that includes an image forming apparatus 1 for acquiring document data to be managed, an image-processing server 2 for performing character recognition of document data and acquiring metadata, and a document-management server 3 for managing document data based on metadata; wherein the image forming apparatus 1 includes: a concealment-target-specifying unit 173 for specifying metadata to be concealed in the document data; and a security-setting-receiving unit 174 that receives a security setting of metadata specified as a concealment target by the concealment-target-specifying unit 173, correlates a metadata name of the concealment target with the security setting, and transmits the security setting together with the document data to the image-processing sever 2; and the document-management server 3 includes: an authenticating unit 331 for performing authentication, and a document-data-storage unit 332 that in the case where there is an access request for document data, allows access to the document data by masking concealment-target metadata 72 with a mask area 80; wherein a lock button 81 for performing an authentication request for canceling the mask is arranged in the mask area 80, and in the case where an authentication request is authenticated by the authenticating unit 331 via the lock button 81, the document-data-storage unit 332 cancels the mask for the concealment-target metadata 72 and makes it possible to visually recognize the concealment-target metadata 72.

As a result, for the document data to be managed, it is possible to respectively perform access restriction related to browsing and printing for each metadata to be concealed. In addition, for the access-restricted metadata, the access restriction can be canceled via the lock button 81, and detailed access restriction can be performed according to the level of concealment to be performed.

In addition, the document management system X is a document management system X that includes an image forming apparatus 1 for acquiring document data to be managed, an image-processing server 2 for performing character recognition of document data and acquiring metadata, and a document-management server 3 for managing document data based on metadata; wherein the image forming apparatus 1 includes: a concealment-target-specifying unit 173 for specifying metadata to be concealed in the document data; and a security-setting-receiving unit 174 that receives a security setting of metadata specified as a concealment target by the concealment-target-specifying unit 173, correlates a metadata name of the concealment target with the security setting, and transmits the security setting together with the document data to the image-processing sever 2; the image processing server 2 includes: a server-storage unit 22 that stores templates 131 in which description positions in the document data are set for the metadata acquired by character recognition of the document data; a character-recognizing unit 231 for performing character recognition of document data transmitted from the image forming apparatus 1; an attribute-information-creating unit 232 that acquires a character string as metadata from the document data for which character recognition has been performed by the character-recognizing unit 231, creates attribute information 322 by correlating coordinate information of the acquired metadata in the document data and the security setting transmitted from the image forming apparatus 1 with the metadata, and transmitting the attribute information 322 and document data 321 to the document-management server 3; and the document-management server 3 includes a document-data-storage unit 332 that, based on the security setting, performs access restriction to the concealment-target metadata included in the document data.

As a result, for the document data to be managed, it is possible to respectively perform access restriction related to browsing and printing for each metadata to be concealed. Moreover, since the coordinate information indicating the description position in the document data is correlated with the metadata, in the case where there is no access authority, the metadata can be masked based on the coordinate information.

The present disclosure is not limited to the above-described embodiments, and it goes without saying that various modifications can be made within a range that does not depart from the spirit of the present disclosure.

What is claimed is:

1. A document management system comprising:
    an image forming apparatus for acquiring document data to be managed;
    an image-processing server for performing character recognition of the document data and acquiring metadata; and
    a document-management server for managing the document data based on the metadata; wherein
    the image forming apparatus comprises:
        a concealment-target-specifying unit for specifying the metadata to be concealed in the document data; and
        a security-setting-receiving unit that receives a security setting of the metadata specified as a concealment target by the concealment-target-specifying unit, correlates a metadata name of the concealment target with the security setting, and transmits the security setting together with the document data to the image-processing sever; and
    the document-management server comprises:
        an authenticating unit for performing user authentication; and
        a document-data-storage unit that, in the case where there is an access request from a user for document data, determines based on the security setting whether or not the user has access authority for the metadata, and allows access to the document data by not masking the metadata for which there is access authority, and masking the metadata for which there is no access authority.

2. The document management system according to claim 1, wherein
    the access authority includes a browsing authority and a printing authority; and
    the document-data-storage unit, in the case where the access request is a browsing request, allows access to the document data by masking the metadata based on the browsing authority, and in the case where the access request is a printing request, allows access to the document data by masking the metadata based on the printing authority.

3. The document management system according to claim 2, wherein
    the printing authority includes a printable number of times; and
    the document data storage unit
    manages the number of times of printing of the document data for each user, and in the case where there is the printing request for the document data from the user and when the number of times of printing is within the printable number of times of the metadata for which there is printing authority, allows printing of the document data without masking the metadata, and when the number of times of printing exceeds the number of printable times of the metadata for which there is printing authority, allows printing of the document data by masking the metadata.

4. The document management system according to claim 1, wherein the access authority is set for any one of each user, each group, and all members disallowed.

5. A document management system comprising:
    an image forming apparatus for acquiring document data to be managed,
    an image-processing server for performing character recognition of the document data and acquiring metadata, and
    a document-management server for managing the document data based on the metadata; wherein
    the image forming apparatus comprises:
        a concealment-target-specifying unit for specifying the metadata to be concealed in the document data; and
        a security-setting-receiving unit that receives a security setting of the metadata specified as a concealment target by the concealment-target-specifying unit, correlates a metadata name of the concealment target with the security setting, and transmits the security setting together with the document data to the image-processing sever; and
    the document-management server comprises
        a document-data-storage unit that, based on the security setting, performs access restriction to the concealment-target metadata included in the document data.

6. The document management system according to claim 5 further comprising
   a touch panel for displaying the document data to be managed, wherein
   the concealment-target-specifying unit
   specifies metadata corresponding to a position specified from inside the document data via the touch panel as a concealment target.

7. The document management system according to claim 5 wherein
   the concealment-target-specifying unit specifies a description area of the concealment-target metadata in the document data; and
   the security-setting-receiving unit correlates a metadata name to be concealed, coordinate information indicating the description area of the metadata to be concealed, and the security setting, and transmits the security setting together with the document data to the image processing server.

8. The document management system according to claim 5 further comprising a document-reading unit for scanning a document with a marked character string to be concealed, wherein
   the concealment-target-specifying unit detects the mark from the document data of the document scanned by the document-reading unit and specifies metadata corresponding to a position where the mark is detected as a concealment target.

9. The document management system according to claim 5 further comprising an apparatus-storage unit that stores a template in which a description position of metadata acquired by character recognition from the document data to be managed is set, wherein
   the concealment-target-specifying unit specifies the metadata to be concealed based on the template.

10. The document management system according to claim 5 wherein
    the security-setting-receiving unit
    receives a setting of browsing authority for metadata that is a concealment target.

11. The document management system according to claim 5 wherein
    the security-setting-receiving unit
    receives a setting of printing authority for metadata that is a concealment target.

12. The document management system according to claim 11 wherein
    the security-setting-receiving unit
    receives a setting of the printable number of times for concealment-target metadata.

13. A document management system comprising:
    an image forming apparatus for acquiring document data to be managed;
    an image-processing server for performing character recognition of the document data and acquiring metadata; and
    a document-management server for managing the document data based on the metadata; wherein
    the image forming apparatus comprises:
        a concealment-target-specifying unit for specifying the metadata to be concealed in the document data; and
        a security-setting-receiving unit that receives a security setting of the metadata specified as a concealment target by the concealment-target-specifying unit, correlates a metadata name of the concealment target with the security setting, and transmits the security setting together with the document data to the image-processing sever; and
    the document-management server comprises:
        an authenticating unit for performing authentication, and
        a document-data-storage unit that, in the case where there is an access request for the document data, allows access to the document data based on the security setting by masking the concealment-target metadata with a mask area; wherein
        a lock button for performing an authentication request for canceling a mask is arranged in the mask area,
        the document-data-storage unit,
        in the case where an authentication request via the lock button is authenticated by the authenticating unit, cancels the mask for the concealment-target metadata and makes it possible to visually recognize the concealment-target metadata.

14. The document management system according to claim 13 wherein
    the authenticating unit
    executes user authentication; and
    the document-data-storage unit,
    in the case where there is an access request for the document data from a user for which user authentication is performed by the authenticating unit, masks the concealment-target metadata based on the security setting and according to access authority of the user, and, in the case where the lock button is operated, requests additional authentication for canceling the mask.

15. The document management system according to claim 13 wherein
    the lock button is arranged in any one of the concealment-target metadata, and
    the document-data-storage unit,
    in the case where an authentication request via the lock button is authenticated by the authenticating unit, cancels the masks for all of the concealment-target metadata, and makes it possible to visually recognize all of the concealment-target metadata.

* * * * *